United States Patent
Jiang et al.

(10) Patent No.: US 10,212,179 B2
(45) Date of Patent: Feb. 19, 2019

(54) METHOD AND SYSTEM FOR CHECKING SECURITY OF URL FOR MOBILE TERMINAL

(71) Applicant: TENCENT TECHNOLOGY (SHENZHEN) COMPANY LIMITED, Shenzhen, Guangdong (CN)

(72) Inventors: Peng Jiang, Shenzhen (CN); Zhen Zhang, Shenzhen (CN); Shaofei Ju, Shenzhen (CN); Shichuan Liu, Shenzhen (CN); Yanjun Luo, Shenzhen (CN); Jiubiao Chen, Shenzhen (CN); Xing Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 223 days.

(21) Appl. No.: 15/160,603

(22) Filed: May 20, 2016

(65) Prior Publication Data
US 2016/0269433 A1    Sep. 15, 2016

Related U.S. Application Data

(63) Continuation of application No. PCT/CN2015/082047, filed on Jun. 23, 2015.

(30) Foreign Application Priority Data

Jun. 24, 2014    (CN) .......................... 2014 1 0289182

(51) Int. Cl.
*H04L 29/06*      (2006.01)
*H04W 12/12*      (2009.01)
(Continued)

(52) U.S. Cl.
CPC .... *H04L 63/1425* (2013.01); *G06F 17/30879* (2013.01); *G06F 17/30887* (2013.01);
(Continued)

(58) Field of Classification Search
CPC .... H04L 63/14; H04L 63/145; H04L 63/1425
See application file for complete search history.

(56) References Cited

U.S. PATENT DOCUMENTS

| 8,505,102 B1 * | 8/2013 | Cannings .............. H04L 63/145 |
| | | 713/187 |
| 8,844,030 B2 | 9/2014 | Yoo |

(Continued)

FOREIGN PATENT DOCUMENTS

| CN | 101159000 A | 4/2008 |
| CN | 101924760 A | 12/2010 |

(Continued)

OTHER PUBLICATIONS

International Search Report in international application No. PCT/CN2015/082047, dated Sep. 30, 2015.
(Continued)

*Primary Examiner* — David J Pearson
(74) *Attorney, Agent, or Firm* — Anova Law Group, PLLC (57) ABSTRACT

A method for checking security of a URL for a mobile terminal includes: receiving a URL security check request sent by a mobile terminal, where the URL security check request includes a URL; determining, through querying, whether there is security information corresponding to the URL; downloading, if there is no security information corresponding to the URL and the URL is a mobile application program download URL, a mobile application program corresponding to the URL; checking security of the mobile application program; and correspondingly storing (Continued)

the security information obtained through checking and the URL.

12 Claims, 8 Drawing Sheets

(51) Int. Cl.
  *G06F 17/30* (2006.01)
  *H04L 29/08* (2006.01)
(52) U.S. Cl.
  CPC ............ *H04L 63/10* (2013.01); *H04L 63/145* (2013.01); *H04L 67/34* (2013.01); *H04W 12/12* (2013.01)

(56) References Cited

U.S. PATENT DOCUMENTS

| | | | | |
|---|---|---|---|---|
| 2007/0174915 | A1* | 7/2007 | Gribble | G06F 21/53 726/24 |
| 2008/0163380 | A1 | 7/2008 | Liu | |
| 2011/0126287 | A1 | 5/2011 | Yoo | |
| 2012/0110174 | A1* | 5/2012 | Wootton | G06F 21/564 709/224 |
| 2012/0324568 | A1* | 12/2012 | Wyatt | G06F 21/51 726/13 |
| 2014/0096241 | A1* | 4/2014 | Li | H04L 63/12 726/22 |
| 2014/0351933 | A1* | 11/2014 | Kim | H04L 63/1425 726/23 |

FOREIGN PATENT DOCUMENTS

| | | |
|---|---|---|
| CN | 102917023 A | 2/2013 |
| CN | 103685251 A | 3/2014 |
| CN | 104378345 A | 2/2015 |

OTHER PUBLICATIONS

English Translation of the Written Opinion of the International Search Authority in international application No. PCT/CN2015/082047, dated Sep. 30, 2015.
Notification of the First Office Action of Chinese application No. 201410289182.9, dated Sep. 28, 2015.

* cited by examiner

Details about a virus​ ​ ​ ​ ​ ​ ​ ​ ​ ​ ​ ​ Collapse

After installation, the virus privately sends a short message service message without permission of a user, thereby causing fee consumption of the user Security level: High risk Infected with a virus a.expense.mry.a If you are sure that there is no risk in the website, you may choose to submit a complaint

METHOD AND SYSTEM FOR CHECKING SECURITY OF URL FOR MOBILE TERMINAL

CROSS REFERENCE TO RELATED APPLICATIONS

This is a continuation application of International Patent Application No. PCT/CN2015/082047, filed on Jun. 23, 2015, which claims priority to Chinese Patent Application No. 201410289182.9 filed on Jun. 24, 2014, the disclosures of which are incorporated by reference herein in their entirety.

FIELD OF THE TECHNOLOGY

The present disclosure relates to the field of the mobile Internet, and in particular, to a method for checking security of a URL for a mobile terminal and a system for checking security of a URL for a mobile terminal.

BACKGROUND OF THE DISCLOSURE

With development of the field of mobile technologies, access by a mobile terminal to the mobile Internet to acquire a corresponding resource has become an important application of a mobile terminal. When a mobile terminal accesses the mobile Internet, various possible manners may be used for access, where a two-dimensional code, as an important entrance to the mobile Internet, refers to a readable bar code that is developed based on a one-dimensional bar code and has another dimension. It uses a black and white rectangular pattern to represent binary data, and is essentially a character string. After code scanning software in a mobile terminal scans and parses a two-dimensional code image successfully, the character string can be obtained, and if it is found that the character string is a uniform resource locator (URL), this URL may be opened by using a browser.

URLs may be classified into mobile application program download URLs and ordinary URLs. The mobile application program download URLs are usually application package file (APK) download URLs, where an APK is an Android application package file, and is a format of an application program installation file in an Android operating system. A web page is displayed after an ordinary URL is opened, while an APK application program is downloaded after an APK download URL is opened, where the application program may be a malicious program, which threatens security of a mobile terminal of a user. Therefore, it is necessary to perform URL security check before a URL of a two-dimensional code is opened, to block a malicious website and a malicious program, thereby protecting security of a mobile terminal of a user.

At present, a few pieces of popular two-dimensional code scanning software provide a capability of checking security of a two-dimensional code website. However, none of the current pieces of two-dimensional code scanning software has a capability of checking security of an APK download URL, and only after an APK is downloaded to a mobile phone can it be detected whether the APK is a malicious program. This manner not only consumes a long time for downloading, but also consumes network traffic of a user. After downloaded to a mobile phone, malicious software may be easily installed on the mobile phone because of a misoperation of a user, thereby threatening security of a mobile phone of the user.

SUMMARY

Embodiments of the present invention use the following technical solutions:

receiving a URL security check request sent by a mobile terminal, the URL security check request including a URL;

determining, through querying, whether there is security information corresponding to the URL;

downloading, if there is no security information corresponding to the URL and the URL is a mobile application program download URL, a mobile application program corresponding to the URL; checking security of the mobile application program; and correspondingly storing security information obtained through checking and the URL.

A method for checking security of a URL for a mobile terminal, including:

sending a URL security check request to a server, the URL security check request including a URL; and receiving security information that is returned by the server and corresponds to the URL, when the URL is a mobile application program download URL, the security information that corresponds to the URL being obtained by the server by downloading a mobile application program corresponding to the URL and checking security of the mobile application program.

A system for checking security of a URL for a mobile terminal, including a server, and the server including:

a server information transceiver module, configured to receive a URL security check request sent by a mobile terminal, the URL security check request including a URL;

a query module, configured to determine, through querying, whether there is stored security information corresponding to the URL;

a URL type detection module, configured to detect whether the URL is a mobile application program download URL;

a download module, configured to: when the query module finds no security information corresponding to the URL and the URL type detection module detects that the URL is a mobile application program download URL, download a mobile application program corresponding to the mobile application program download URL; and a security check module, configured to check security of the mobile application program, and correspondingly store security information obtained through checking and the URL.

DESCRIPTION OF EMBODIMENTS

The solutions of the present disclosure are described in detail below with reference to preferred implementation manners thereof. In the following description, embodiments of a method for checking security of a URL for a mobile terminal of the present disclosure are described first, and then an embodiment of a system for checking security of a URL for a mobile terminal of the present disclosure is described.

The method as disclosed as follows may be implemented by any appropriate computing device having one or more processors and a memory. The computing device, used herein, may refer to any appropriate device with certain computing capabilities (e.g., a method for checking security of a URL), such as a terminal or a sever. The memory includes a storage medium, which may further include memory modules, e.g., a read-only memory (ROM), a random access memory (RAM), and flash memory modules, and mass storage, e.g., a CD-ROM, a U-disk, a removable hard disk, etc, which are all non-transitory storage media. The storage medium may store computer programs for implementing various processes, when executed by the processors.

A terminal, as used herein, may refer to any appropriate user terminal with certain computing capabilities, e.g., a personal computer (PC), a work station computer, a hand-held computing device (e.g., a tablet), a mobile terminal (e.g., a mobile phone or a smart phone), or any other client-side computing device.

A server, as used herein, may refer to one or more server computers configured to provide certain server functionalities. A server may also include one or more processors to execute computer programs in parallel.

Figure 1:
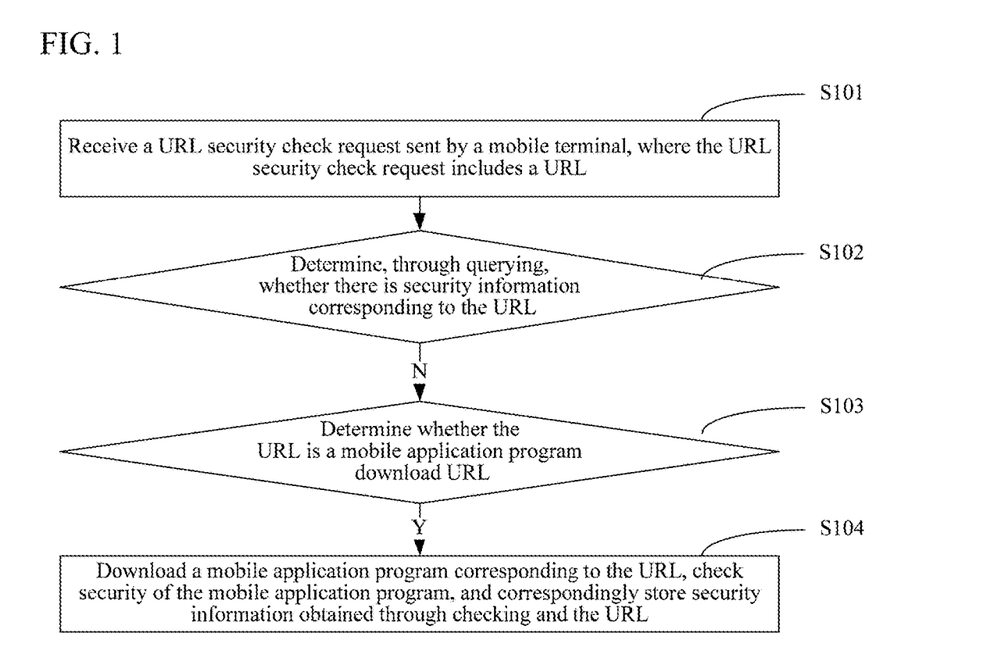
FIG. 1 is a schematic flowchart of Embodiment 1 of a method for checking security of a URL for a mobile terminal of the present disclosure.

FIG. 1 shows a schematic flowchart of Embodiment 1 of a method for checking security of a URL for a mobile terminal of the present disclosure. In FIG. 1, a processing process of a server is used as an example for description.

As shown in FIG. 1, the method for checking security of a URL for a mobile terminal in this embodiment includes:

Step S101: Receive a URL security check request sent by a mobile terminal, where the URL security check request includes a URL.

Step S102: Determine, through querying, whether there is security information corresponding to the URL, and if there is no security information corresponding to the URL, perform step S103.

Step S103: Determine whether the URL is a mobile application program download URL, and if yes, perform step S104.

Step S104: Download a mobile application program corresponding to the URL, check security of the mobile application program, and correspondingly store security information obtained through checking and the URL.

Figure 2:
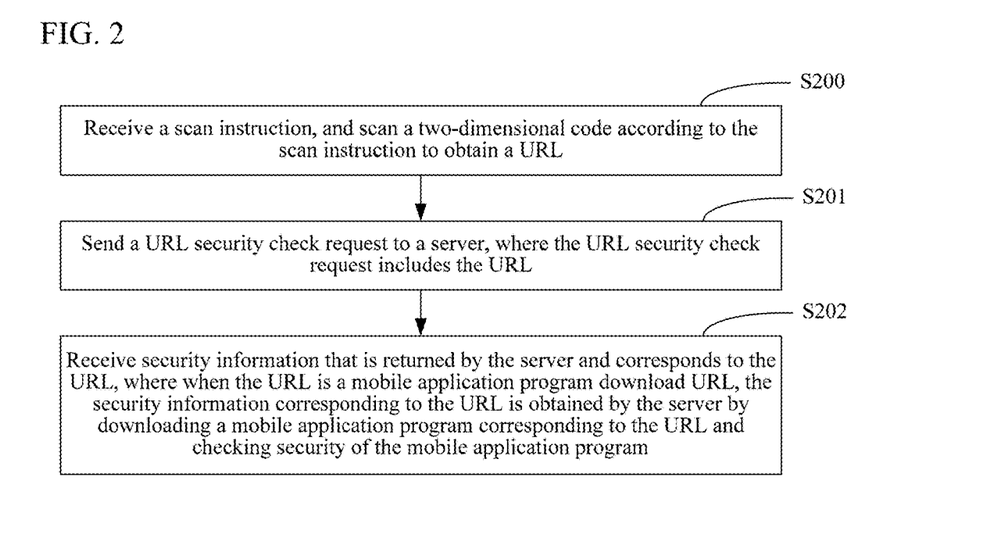
FIG. 2 is a schematic flowchart of Embodiment 2 of a method for checking security of a URL for a mobile terminal of the present disclosure.

Similarly, FIG. 2 shows a schematic flowchart of Embodiment 2 of a method for checking security of a URL for a mobile terminal of the present disclosure. In FIG. 2, a processing process of a mobile terminal is used as an example for description.

As shown in FIG. 2, the method for checking security of a URL for a mobile terminal in the embodiment includes:

Step S201: Send a URL security check request to a server, where the URL security check request includes a URL.

Step S202: Receive security information that is returned by the server and corresponds to the URL, where when the URL is a mobile application program download URL, the security information corresponding to the URL is obtained by the server by downloading a mobile application program corresponding to the URL and checking security of the mobile application program.

According to the solutions of the embodiments of the present invention, after the URL security check request of the mobile terminal is sent to the server, when the server finds that there is no security information corresponding to the URL, and in a case in which the URL is a mobile application program download URL, the server downloads the mobile application program corresponding to the URL, checks the security of the mobile application program, and correspondingly stores the security information obtained through checking and the URL. Therefore, the mobile terminal can know the security information of the mobile application program without the need to download the mobile application program, and a user can choose, based on the security information, whether to continue to download the mobile application program, thereby improving security of downloading of a mobile application program by a mobile terminal.

A two-dimensional code is an important entrance to the mobile Internet. Obtaining a URL by scanning a two-dimensional code to access a corresponding resource has already become an important application of a mobile terminal; especially, downloading a mobile application program by a mobile terminal by scanning a two-dimensional code has already been a main application manner of a two-dimensional code. However, a potential security risk exists when a mobile application program is downloaded by scanning a two dimensional. Therefore, in a specific implementation manner, the solutions of present disclosure may be a security check manner for a URL obtained by scanning a two-dimensional code.

Based on this, in a specific embodiment, as shown in FIG. 2, before the mobile terminal sends the URL security check request to the server, the method may further include:

Step S200: Receive a scan instruction, and scan a two-dimensional code according to the scan instruction to obtain the URL.

In this case, correspondingly, the URL in the URL security check request received by the server in step S101 is a URL obtained by scanning a two-dimensional code.

In addition, after obtaining the security information corresponding to the mobile application program through checking in step S104, the server may directly return the security information to the mobile terminal, so that the mobile terminal can know in time whether the mobile application program downloaded by the mobile terminal is secure.

Considering time consumed for downloading the mobile application program and time needed for checking the security of the mobile application program, in another implementation manner, it is also feasible to only correspondingly store the security information obtained through checking and the URL, and the security information is not returned to the mobile terminal, so that for a next URL security check request for the mobile application program, the security information of the URL can be returned to a subsequent corresponding mobile terminal in time. Correspondingly, when it is detected in step S103 that the URL is a mobile application program download URL, prompt information about unknown security may be returned to the mobile terminal, so that a user decides a subsequent operation for a next step, for example, stops downloading the mobile application program or continues to download the mobile application program.

When it is found in step S102 that there is security information corresponding to the URL, the security information corresponding to the URL may be sent to the mobile terminal, so that the mobile terminal learns the security information of the URL.

In addition, in another implementation manner, when no security information corresponding to the URL is found in step S102, prompt information about unknown security may be returned to the mobile terminal directly. At the same time, similar to the manner for processing the mobile application program download URL, the security of the URL is checked, and the security information obtained through checking and the URL are correspondingly stored, so that when a URL security check request for the mobile application program is received for a next time, the security information of the URL is returned to a subsequent corresponding mobile terminal in time.

For an ordinary URL that is not a mobile application program download URL, because the URL is generally displayed in a form of a webpage, a data volume of webpage content is relatively small, and a speed of checking security of the URL on the webpage content is relatively quick; therefore, in another processing manner, when it is detected in step S103 that the URL is not a mobile application program download URL, the security of the URL may still be checked, and security information obtained through checking is returned to the mobile terminal.

When it is determined in step S103 whether the URL is a mobile application program download URL, various possible manners may be used, for example, according to a name extension or a prefix of the URL or content of a response obtained after the URL is opened.

For a mobile application program download URL, a name extension thereof is usually represented in a specific format. Using an application program installation file in an Android operating system as an example, a format of a name extension thereof is usually .apk; therefore, when a name extension of a URL is .apk, it can be determined that the URL is an APK download URL. For an application program download file of another type, there is usually a similar processing manner. Therefore, it may be distinguished according to a name extension of the URL whether the URL is a mobile application program download URL.

In addition, for a mobile application program download URL, in most URL presentation manners at present, a word such as download is included in a prefix thereof to indicate that the URL is a software download link. Therefore, the URL may also be distinguished according to a prefix of the URL.

In addition, for an ordinary URL and a mobile application program download URL, responses of the server to the two URLs are different in content. For the ordinary URL, content of a response of the server to the ordinary URL is generally text content, while for the mobile application program download URL, content of a response of the server to the mobile application program download URL is generally a file in a certain format. Therefore, it can be distinguished according to content of a response obtained after the URL is opened whether the URL is a mobile application program download URL.

When the security of the URL (including a mobile application program download URL or a URL of another type) is checked, a check result may include a security level such as high risk, medium risk, low risk, secure, or unknown. Further, in a case in which it is detected that the URL is dangerous, information such as a virus name and details about a virus may further be included.

Base on the above-described method for checking security of a URL for a mobile terminal of the present disclosure, detailed description is made below with reference to several specific examples of the method. For ease of description and understanding, in the description of the several examples below, the description is made with reference to a process of interaction between a mobile terminal and a server, which is described by using an example that a URL is obtained by scanning a two-dimensional code.

Figure 3:
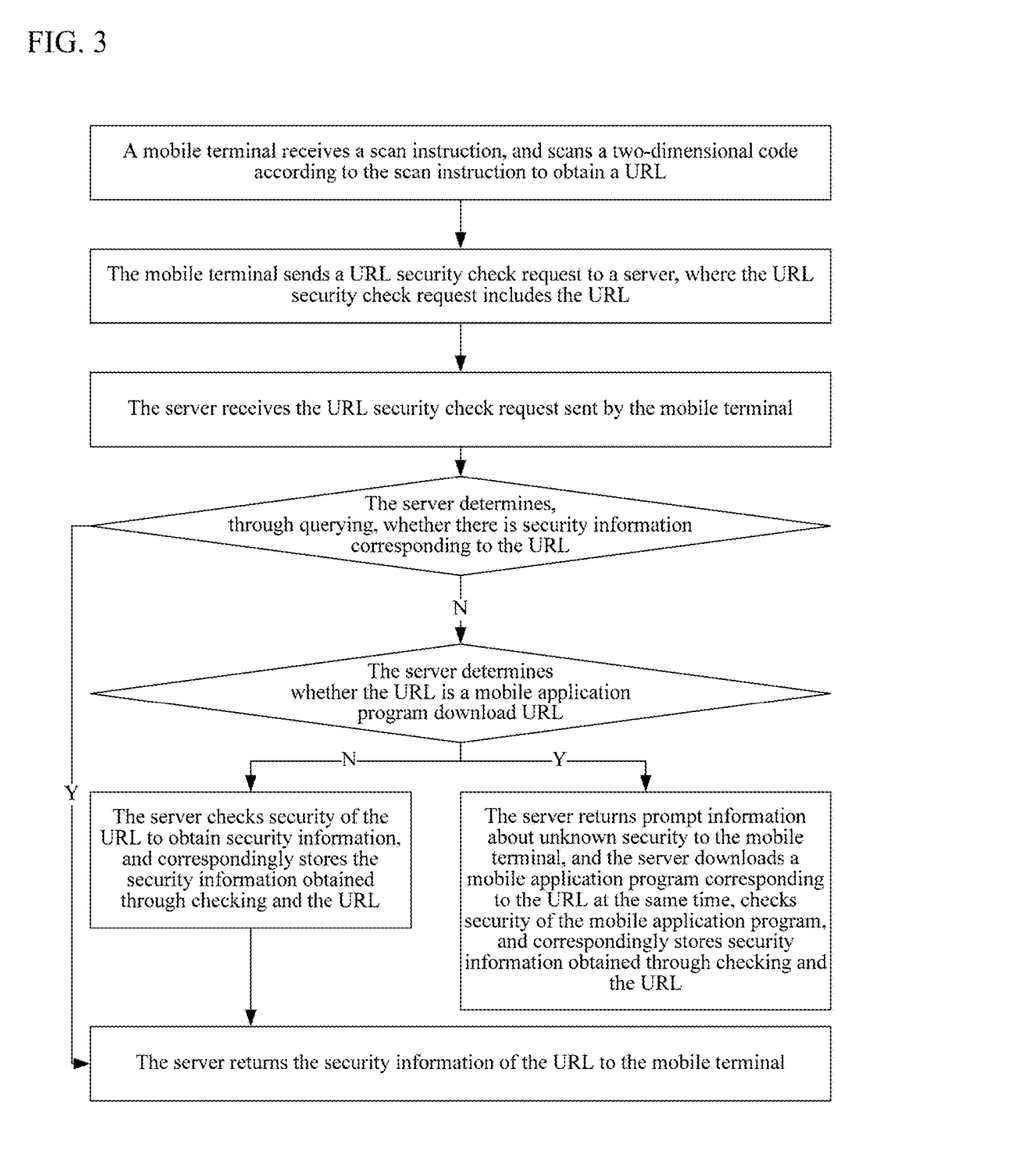
FIG. 3 is a schematic flowchart of a method for checking security of a URL for a mobile terminal in a specific example.
Figure 4:
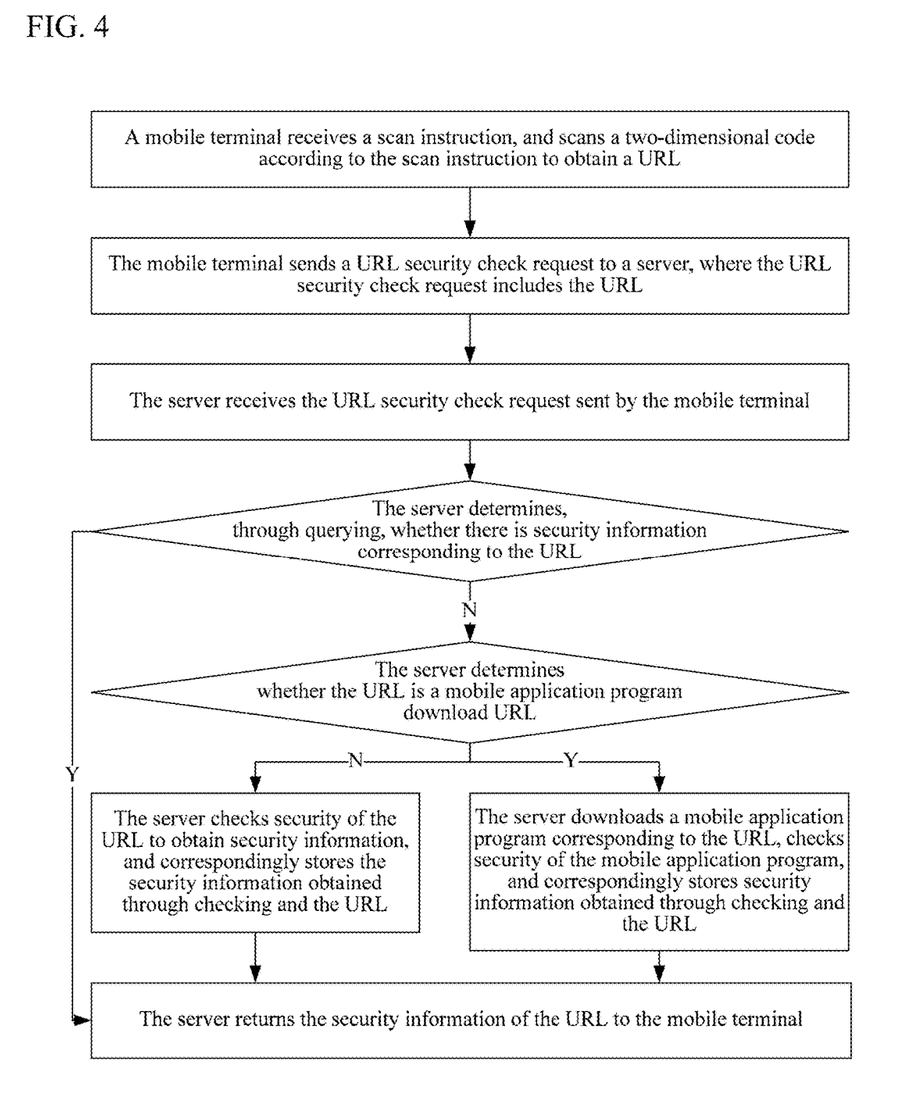
FIG. 4 is a schematic flowchart of a method for checking security of a URL for a mobile terminal in a second specific example.

FIG. 3 and FIG. 4 show schematic flowcharts of embodiments of the method for checking security of a URL for a mobile terminal in two specific examples. In the two examples, differences thereof mainly lie in a processing manner when a server has no security information corresponding to a URL in a URL security check request and the URL is a mobile application program download URL.

As shown in FIG. 3 and FIG. 4, in the specific examples, a mobile terminal receives a scan instruction, scans a two-dimensional code according to the scan instruction, and obtains a URL corresponding to the two-dimensional code; and subsequently, the mobile terminal sends a URL security check request to a server, where the URL security check request includes the URL obtained through scanning.

After receiving the URL security check request, the server determines, through querying, whether there is security information corresponding to the URL.

If there is security information corresponding to the URL, the found security information corresponding to the URL is sent to the mobile terminal.

If there is no security information corresponding to the URL, it is further determined whether the URL is a mobile application program download URL.

If the URL is not a mobile application program download URL, security of the URL is checked to obtain security information of the URL, the security information obtained through checking and the URL are correspondingly stored, and the security information is returned to the mobile terminal. After receiving the security information, the mobile terminal may display the security information, so that a user of the mobile terminal knows whether the URL is secure.

If the URL is a mobile application program download URL, as shown in FIG. 3, the server returns prompt information about unknown security of the URL to the mobile terminal, and the server may download a mobile application program corresponding to the URL at the same time, check security of the mobile application program, and correspondingly store security information obtained through checking and the URL, so that when a URL security check request including the mobile application program download URL is received subsequently, the security information of the URL can be found in time and returned to a mobile terminal.

If the URL is a mobile application program download URL, in another implementation manner, as shown in FIG. 4, after downloading a mobile application program corresponding to the URL, the server checks security of the URL to obtain security information of the URL, correspondingly stores the security information obtained through checking and the URL, and returns the security information to the mobile terminal. After receiving the security information, the mobile terminal may display the security information, so that a user of the mobile terminal knows whether the URL is secure.

Figure 5:
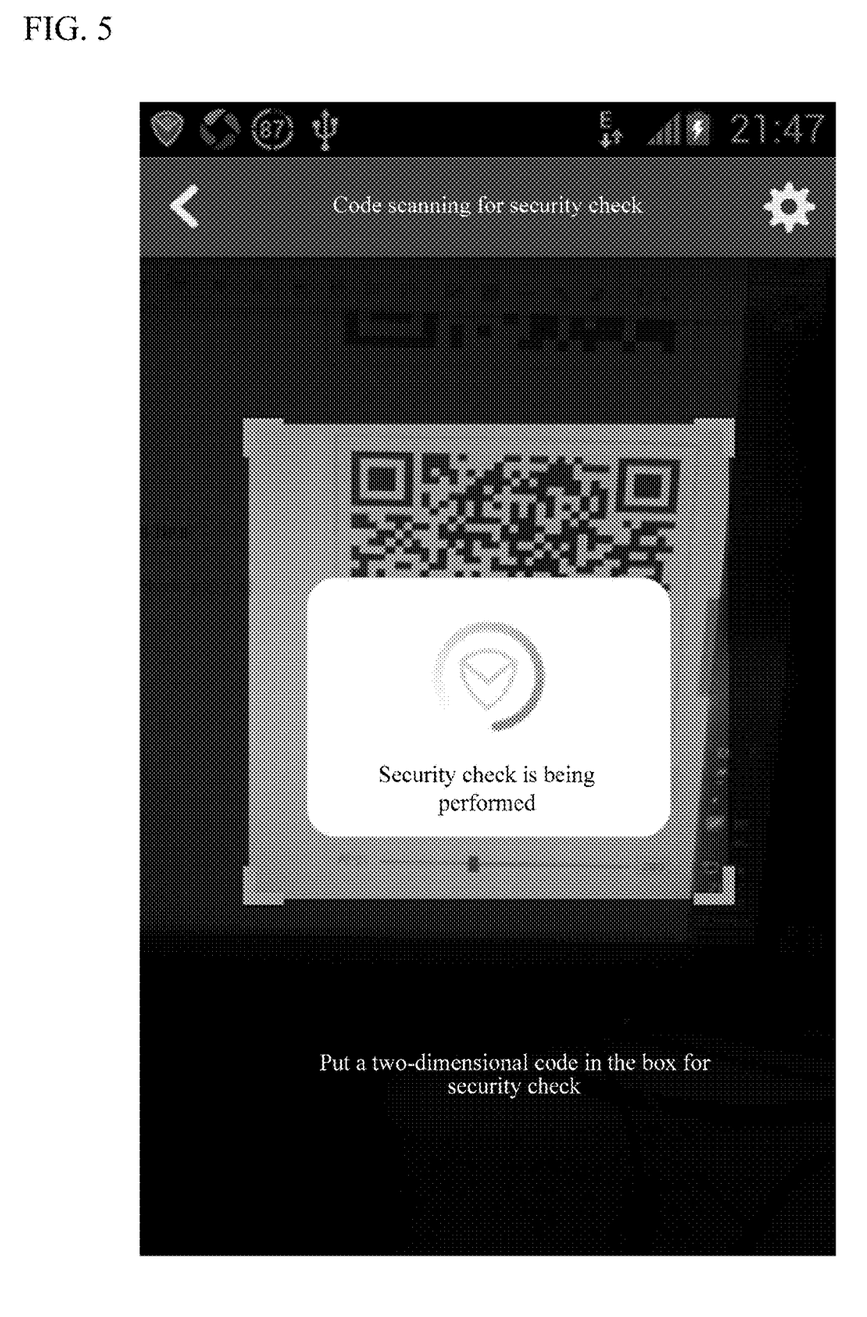
FIG. 5 is a schematic diagram of an interface for checking an APK download URL in an application example.
Figure 6:
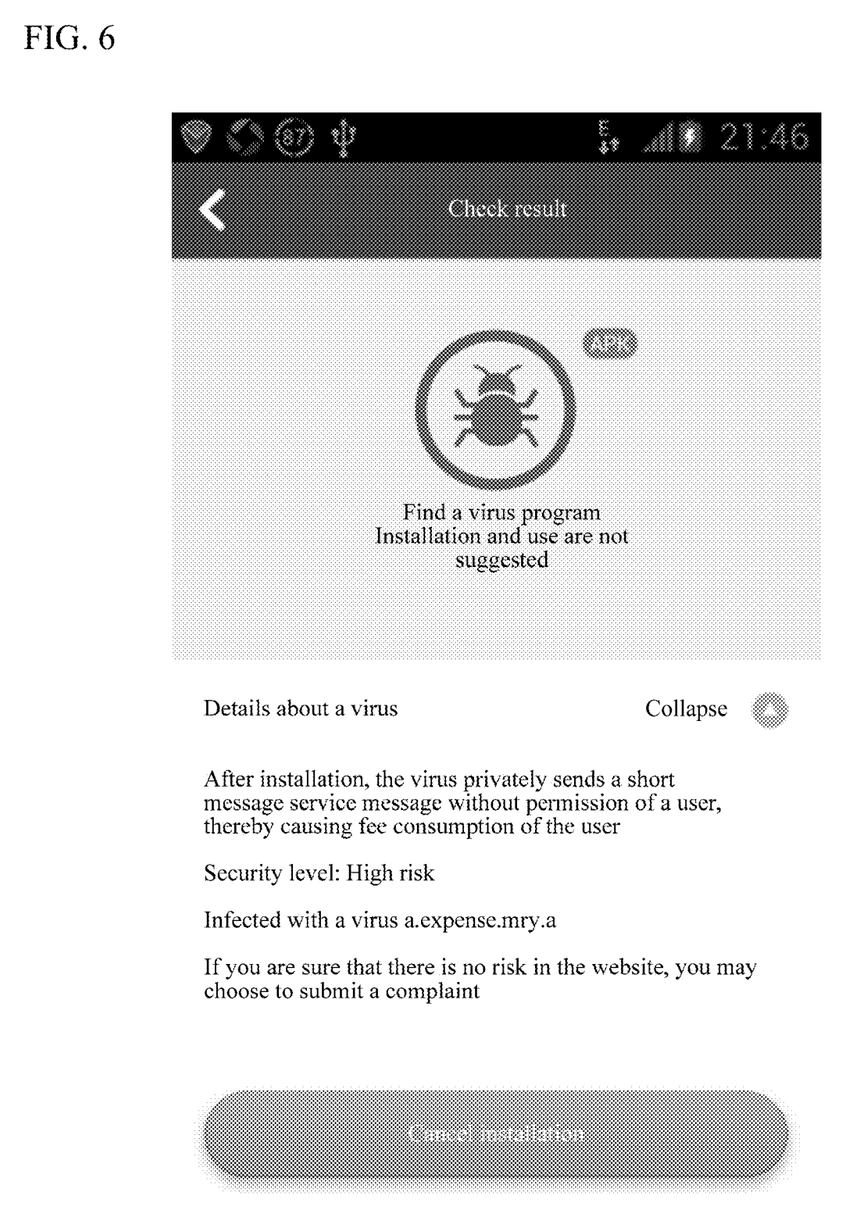
FIG. 6 is a schematic diagram of security information returned by a server and displayed by a mobile terminal in an application example.

With reference to the specific examples in FIG. 3 and FIG. 4, FIG. 5 shows a schematic diagram of an interface for checking an APK download URL in an application example, and FIG. 6 shows a schematic diagram of security information returned by a server and displayed by a mobile terminal in an application example.

As shown in FIG. 5, in a case in which the URL security check request is sent by scanning the two-dimensional code, a prompt message such as "security check is being performed" may be displayed on a two-dimensional code scanning interface to indicate that the security of the URL is being checked.

As shown in FIG. 6, after the mobile terminal receives the security information returned by the server, the received security information may be displayed on a mobile terminal in which the security information is located, where the security information may include a check result, advice information, details about a virus, and the like. When the security information is displayed on the mobile terminal, considering that users of different types may pay attention to different content, an ordinary user may only need to know whether a URL is secure and does not care about a reason for insecurity, while a professional user may want to know specific details about a virus; therefore, a control such as "collapse" may further be provided so that a user chooses to expand or hide content of details about a virus. In addition, a control such as "cancel download" may further be provided so that a user chooses to cancel downloading of the URL, thereby ensuring security of the mobile terminal.

Based on the same idea as the foregoing method for checking security of a URL for a mobile terminal of the present disclosure, the present disclosure further provides a system for checking security of a URL for a mobile terminal. The system for checking security of a URL for a mobile terminal provided in the present disclosure may include only a server or only a mobile terminal, or may include both a mobile terminal and a server.

Figure 7:
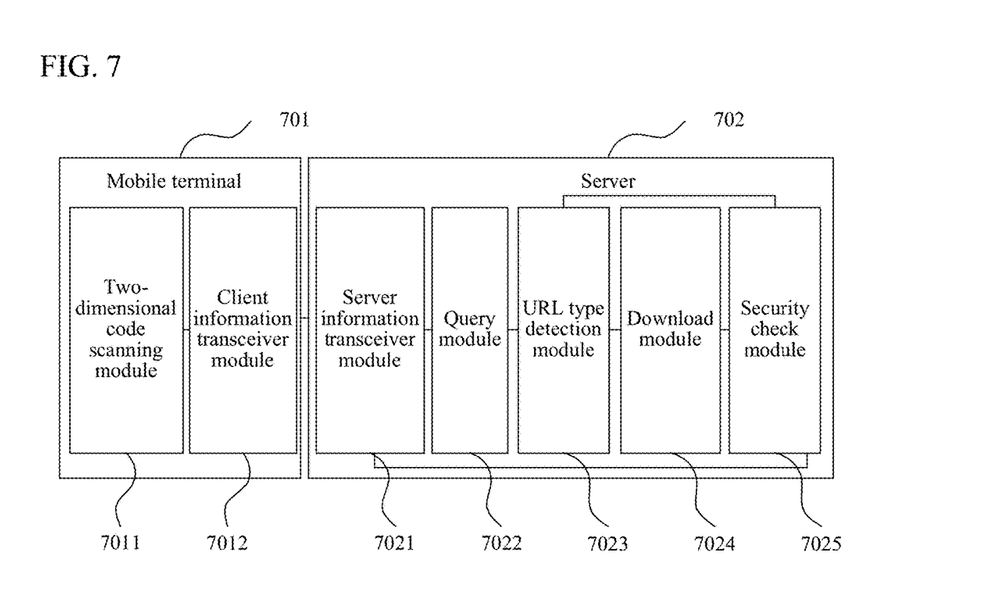
FIG. 7 is a schematic structural diagram of an embodiment of a system for checking security of a URL for a mobile terminal of the present disclosure.

FIG. 7 is a schematic structural diagram of an embodiment of a system for checking security of a URL for a mobile terminal of the present disclosure. For ease of description and understanding, in FIG. 7, an example that both a mobile terminal and a server are included is used for description.

As shown in FIG. 7, the system in the example includes a mobile terminal 701 and a server 702.

The mobile terminal 701 includes:

a client information transceiver module 7012, configured to send a URL security check request to the server 702, where the URL security check request includes a URL, and receive security information that is returned by the server 702 and corresponds to the URL, where when the URL is a mobile application program download URL, the security information corresponding to the URL is obtained by the server 702 by downloading a mobile application program corresponding to the URL and checking security of the mobile application program.

The server 702 includes:

a server information transceiver module 7021, configured to receive the URL security check request sent by the mobile terminal 701, where the URL security check request includes the URL;

a query module 7022, configured to determine, through querying, whether there is stored security information corresponding to the URL;

a URL type detection module 7023, configured to detect whether the URL is a mobile application program download URL;

a download module 7024, configured to: when the query module 7022 finds no security information corresponding to the URL and the URL type detection module 7023 detects that the URL is a mobile application program download URL, download the mobile application program corresponding to the mobile application program download URL; and a security check module 7025, configured to check the security of the mobile application program, and correspondingly store security information obtained through checking and the URL.

According to the solutions of the embodiments of the present invention, after the URL security check request of the mobile terminal is sent to the server, when the server finds that there is no security information corresponding to the URL, and in a case in which the URL is a mobile application program download URL, the server downloads the mobile application program corresponding to the URL, checks the security of the mobile application program, and correspondingly stores the security information obtained through checking and the URL. Therefore, the mobile terminal can know the security information of the mobile application program without the need to download the mobile application program, and a user can choose, based on the security information, whether to continue to download the mobile application program, thereby improving security of downloading of a mobile application program by a mobile terminal by using a URL security check request.

A two-dimensional code is an important entrance to the mobile Internet. Obtaining a URL by scanning a two-dimensional code to access a corresponding resource has already become an important application of a mobile terminal; especially, downloading a mobile application program by a mobile terminal by scanning a two-dimensional code has already been a main application manner of a two-dimensional code. However, a potential security risk exists when a mobile application program is downloaded by scanning a two dimensional. Therefore, in a specific implementation manner, the solutions of present disclosure may be a security check manner for a URL obtained by scanning a two-dimensional code.

Base on this, in a specific embodiment, as shown in FIG. 7, the mobile terminal 701 may further include:

a two-dimensional code scanning module 7011, configured to receive a scan instruction, and scan a two-dimensional code according to the scan instruction to obtain the URL.

In this case, correspondingly, the URL in the URL security check request sent by the client information transceiver module and the URL in the URL security check request received by the server are a URL obtained by the two-dimensional code scanning module 7011 by scanning a two-dimensional code.

In addition, after the query module 7022 finds the security information corresponding to the URL, the server information transceiver module 7021 may directly return the security information to the mobile terminal 701, so that the mobile terminal 701 can know in time whether the URL requested by the mobile terminal is secure.

In another implementation manner, when the query module 7022 finds that there is no security information corresponding to the URL, the server information transceiver module 7021 may return prompt information about unknown security to the mobile terminal 701.

In another implementation manner, when the query module 7022 finds no security information corresponding to the URL and the URL type detection module 7023 detects that the URL is not a mobile application program download URL, the security check module 7025 checks security of the URL and returns, by using the server information transceiver module 7021, the security information obtained through checking to the mobile terminal.

In addition, the server information transceiver module 7021 is further configured to return the security information obtained by the security check module 7025 by checking the mobile application program to the mobile terminal 701.

When the URL type detection module determines whether the URL is a mobile application program download URL, various possible manners may be used, for example, according to a name extension or a prefix of the URL or content of a response obtained after the URL is opened.

For a mobile application program download URL, a name extension thereof is usually represented in a specific format. Using an application program installation file in an Android operating system as an example, a format of a name extension thereof is usually .apk; therefore, when a name extension of a URL is .apk, it can be determined that the URL is an APK download URL. For an application program download file of another type, there is usually a similar processing manner. Therefore, it may be distinguished according to a name extension of the URL whether the URL is a mobile application program download URL.

In addition, for a mobile application program download URL, in most URL presentation manners at present, a word such as download is included in a prefix thereof to indicate that the URL is a software download link. Therefore, the URL may also be distinguished according to a prefix of the URL.

In addition, for an ordinary URL and a mobile application program download URL, responses of the server to the two URLs are different in content. For the ordinary URL, content of a response of the server to the ordinary URL is generally text content, while for the mobile application program download URL, content of a response of the server to the mobile application program download URL is generally a file in a certain format. Therefore, it can be distinguished according to content of a response obtained after the URL is opened whether the URL is a mobile application program download URL.

When the security check module 7025 checks the security of the URL (including a mobile application program download URL or a URL of another type), a check result may include a security level such as high risk, medium risk, low risk, secure, or unknown. Further, in a case in which it is detected that the URL is dangerous, information such as a virus name and details about a virus may further be included.

Base on the system shown in FIG. 7 of the present disclosure, detailed description is made below with reference to two examples. In the specific examples, the two-dimensional code scanning module 7011 of the mobile terminal 701 receives a scan instruction, scans a two-dimensional code according to the scan instruction, and obtains a URL corresponding to the two-dimensional code. Subsequently, the client information transceiver module 7012 of the mobile terminal sends a URL security check request to the server 702, where the URL security check request includes the URL obtained by the scanning.

After the server information transceiver module 7021 of the server 702 receives the URL security check request, the query module 7022 determines, through querying, whether there is security information corresponding to the URL.

If the query module 7022 finds that there is security information corresponding to the URL, the found security information corresponding to the URL is sent to the mobile terminal 701 by using the server information transceiver module 7021.

If the query module 7022 finds that there is no security information corresponding to the URL, the URL type detection module 7023 further determines whether the URL is a mobile application program download URL.

If the URL type detection module 7023 determines that the URL is not a mobile application program download URL, the security check module 7025 checks security of the URL to obtain security information of the URL, correspondingly stores the security information obtained through checking and the URL, and returns the security information to the mobile terminal 701 by using the server information transceiver module 7021. After receiving the security information by using the client information transceiver module 7012, the mobile terminal 701 may display the security information, so that a user of the mobile terminal 701 knows whether the URL is secure.

If the URL type detection module 7023 determines that the URL is a mobile application program download URL, the server information transceiver module 7021 of the server 702 returns prompt information about unknown security of the URL to the mobile terminal 701, and the server 702 may download, by using the download module 7024, a mobile application program corresponding to the URL at the same time, check security of the mobile application program by using the security check module 7025, and correspondingly store security information obtained through checking and the URL, so that when a URL security check request including the mobile application program download URL is received subsequently, the query module 7022 can find the security information of the URL in time and return the security information of the URL to a mobile terminal.

In another implementation manner, if the URL type detection module 7023 determines that the URL is a mobile application program download URL, after the download module 7024 downloads a mobile application program corresponding to the URL, the server 702 checks security of the URL by using the security check module 7025 to obtain security information of the URL, correspondingly stores the security information obtained through checking and the URL, and returns the security information to the mobile terminal by using the server information transceiver module 7021. After receiving the security information by using the client information transceiver module 7012, the mobile terminal 701 may display the security information, so that a user of the mobile terminal 701 knows whether the URL is secure.

When the server 702 in the system of the present disclosure is specifically applied and implemented, there may be various implementation manners. In one manner, the server 702 may be disposed on a same device. In another manner, to make division of roles and responsibilities clearer, modules may also be disposed on different devices. Base on this, FIG. 8 shows an example of a hardware architecture of the system of the present disclosure in a specific application scenario.

Figure 8:
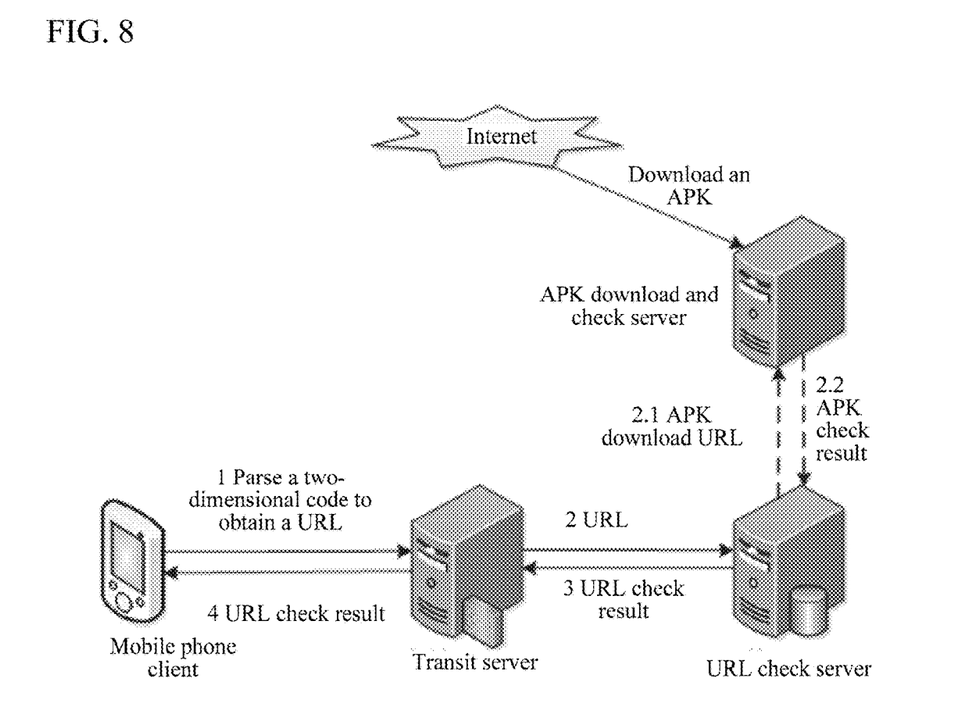
FIG. 8 is an example of a hardware architecture of a system for checking security of a URL for a mobile terminal of the present disclosure in a specific application scenario.

With reference to FIG. 8, the mobile terminal in the solutions of the present disclosure may be disposed in a mobile phone terminal, the download module and the security check module of the server may be disposed in an APK download and check server, and other modules of the server may be disposed in a URL check server.

Using the mobile application program download URL being an APK download URL as an example, in an operation process, a mobile phone terminal scans and parses a two-dimensional code. After the two-dimensional code is successfully parsed, if a URL is obtained through parsing, a URL security check request is sent, where the URL security check request includes the URL obtained through scanning. The URL is sent to the URL check server by using a transit server.

After receiving the URL uploaded by the mobile phone terminal, the URL check server first searches a database thereof to determine whether there is security information corresponding to the URL. If there is security information corresponding to the URL, a result is directly returned to the mobile phone terminal; or if there is no security information corresponding to the URL, prompt information about "unknown security" is returned to the mobile terminal. At the same time, the URL check server opens this URL, and determines whether the URL is an APK download URL according to content of a response to the URL. If the URL is an APK download URL, the URL check server further initiates a request to the "APK download and check server", and the APK download and check server downloads an APK program to check whether there is a virus, and sends a check result back to the URL check server. The URL check server saves this APK check result in the database thereof, so that next time a mobile terminal submits the same URL, the saved check result can be directly returned to the mobile terminal.

It should be noted that, unless the context clearly indicates otherwise, singular elements or components in the present disclosure may be in the plural and vice versa, which is not limited in the present disclosure. Although steps in the present disclosure are labeled with numbers, such numbers are not intended to limit the order of these steps. Unless the order of steps is explicitly stated or it is explicitly stated that a step needs to be performed on the basis of another step, the relative order of steps can be adjusted. It should be understood that as used herein, the term "and/or" involves and includes any and all combinations of one or more of the associated listed items.

A person of ordinary skill in the art may understand that all or some of the procedures in the method that implements the foregoing embodiments of the present invention may be implemented by a computer program instructing relevant hardware. The program may be stored in a computer readable storage medium. When the program runs, the procedures of the method embodiment are performed. The storage medium may be: a magnetic disk, an optical disc, a ROM, a RAM, or the like. Therefore, according to the solutions of the embodiments of the present invention, the present disclosure further provides a storage medium including a computer readable program, and when the computer readable program in the storage medium runs, the method for checking security of a URL for a mobile terminal in any one of the foregoing manners of the present disclosure can be implemented.

The method of the embodiments of the present invention as described above may be installed on a corresponding machine device in a form of software, and when the software runs, the process for checking security of a URL for a mobile terminal can be implemented by controlling a related processing device. Correspondingly, the mobile terminal and the server included in the foregoing system for checking security of a URL for a mobile terminal may be separately disposed on corresponding terminal devices, or may be corresponding terminal devices. Herein, the terminal device may be any terminal device such as a computer, a mobile phone, a tablet computer, a personal digital assistant (PDA), or a vehicle-mounted computer.

Figure 9:
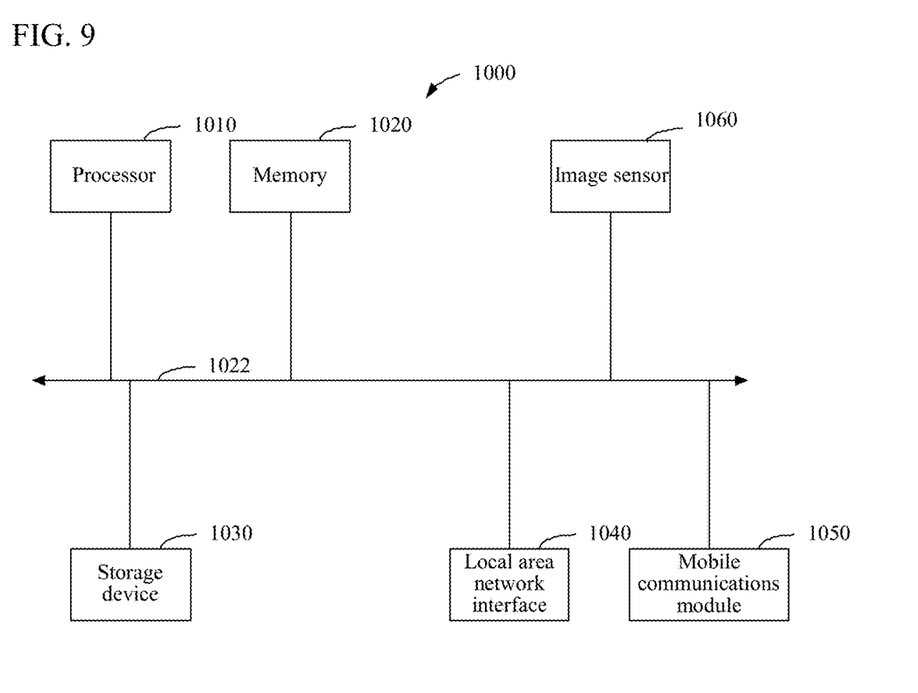
FIG. 9 is a block diagram of a computer system 1000 that can implement embodiments of the present invention.

FIG. 9 is a block diagram of a computer system 1000 that can implement the embodiments of the present invention. The computer system 1000 is merely an example of computer environments applicable to the present disclosure, and should not be construed as any limitation on the application scope of the present disclosure. The computer system 1000 should not be interpreted as needing to rely on or have one or a combination of parts of the exemplary computer system 1000 shown in FIG. 9 either.

The computer system 1000 shown in FIG. 9 is an example of computer systems suitable for use in the present disclosure. Other architectures having different subsystem configurations may also be used. For example, well-known devices such as a desktop computer, a notebook computer, a PDA, a smart phone, a tablet computer, and a portable media player are applicable to some embodiments of the present invention, but the present disclosure is not limited thereto.

As shown in FIG. 9, the computer system 1000 includes a processor 1010, a memory 1020 and a system bus 1022. Various system components including the memory 1020 and the processor 1010 are connected to the system bus 1022. The processor 1010 is hardware for executing computer program instructions by means of basic arithmetic and logic operations in the computer system. The memory 1020 is a physical device for temporarily or permanently storing computer programs or data (for example, program state information), and the URL and the security information corresponding to the URL in the solutions of the present disclosure may be stored on the memory 1020. The system bus 1022 may be any one of the following types of bus structures: a memory bus or memory controller, a peripheral bus and a local bus. The processor 1010 and the memory 1020 can perform data communication through the system bus 1022. The memory 1020 includes a ROM or a flash memory (both not shown), and a RAM, where the RAM generally refers to a main memory loaded with an operating system and application programs.

The computer system 1000 generally includes one storage device 1030. The storage device 1030 may be selected from multiple types of computer readable media. The computer readable media refer to any available media that can be accessed by the computer system 1000, and include removable media and non-removable media. For example, the computer readable media include, but not limited to, a flash memory (micro SD card), a CD-ROM, a digital versatile disc (DVD) or other optical storage, a cassette, a magnetic tape, a disk storage or other magnetic storage devices, or any other media that can be used to store required information and can be accessed by the computer system 1000.

The computer system 1000 may be logically connected to one or more network devices in a network environment. The network device may be a personal computer, a server, a router, a smart phone, a tablet computer or other public network nodes. The computer system 1000 is connected to the network device through a local area network (LAN) interface 1040 or a mobile communications module 1050. A local area network (LAN) refers to an interconnected computer network in a limited area such as a family, a school, a computer laboratory, or an office building using network media. WiFi and Ethernet over twisted pair are the most commonly used two technologies for building a local area network. WiFi is a technology that enables the computer systems 1000 to exchange data or to be connected to a wireless network through radio waves. The mobile communications module 1050 is capable of making and receiving calls through radio communications lines while moving in a broad geographic area. In addition to calling, the mobile communications module 1050 also supports Internet access in a 2G, 3G or 4G cellular communications system that provides mobile data services.

The computer system 1000 includes an image sensor 1060 for capturing images, uses the image sensor 1060 for image capturing to obtain a two-dimensional code image, thereby converting an optical image into an electronic signal. The two-dimensional code image obtained by using the image sensor 1060 may be analyzed by using the processor, to analyze whether the two-dimensional code is a URL.

It should be noted that other computer systems including more or fewer subsystems than those of the computer system 1000 are also applicable to the present disclosure. For example, the computer system 1000 may include a Bluetooth unit capable of exchanging data in a short distance.

As described above in detail, the computer system 1000 applicable to the present disclosure can execute specified operations in the method for checking security of a URL for a mobile terminal. The computer system 1000 executes these operations in the form of running software instructions in the computer readable media by the processor 1010. These software instructions may be read into the memory 1020 from the storage device 1030 or from another device through the LAN interface 1040. The software instructions stored in the memory 1020 enable the processor 1010 to execute the method for checking security of a URL for a mobile terminal. In addition, the present disclosure may also be implemented by using a hardware circuit or by using a combination of a hardware circuit and software instructions. Therefore, the implementation of the present disclosure is not limited to any particular combination of a hardware circuit and software.

The foregoing embodiments only describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A method for checking security of a uniform resource locator (URL) for a mobile terminal, comprising:
   at a server having one or more processors and a memory storing programs executed by the one or more processors;
   receiving a first URL security check request sent by a first mobile terminal, the first URL security check request comprising a URL;
   determining, through querying, whether there is security information corresponding to the URL;
   when determining that there is security information corresponding to the URL, sending the security information corresponding to the URL to the first mobile terminal;
   in response to determining that there is no security information corresponding to the URL, determining whether the URL is a mobile application program download URL;
   if the URL is not a mobile application program download URL, checking and obtaining the security information of the URL; and returning the security information of the URL to the first mobile terminal;
   if the URL is a mobile application program download URL,
      returning prompt information about unknown security to the first mobile terminal and requesting a subsequent operation from a user;
      at a same time of returning the prompt information about unknown security, downloading, a mobile application program corresponding to the URL;
      checking security of the downloaded mobile application program, and acquiring the security information of the mobile application program; and
      directly storing the security information of the mobile application program obtained through checking the URL without returning the security information of the mobile application program to the first mobile terminal.

2. The method for checking security of a URL for a mobile terminal according to claim 1, wherein the URL is a URL obtained by scanning a two-dimensional code.

3. The method for checking security of a URL for a mobile terminal according to claim 1, wherein the security information comprises any piece or any combination of the following information: a security level of the mobile application program, a name of a virus comprised in the mobile application program, and details about the virus.

4. The method for checking security of a URL for a mobile terminal according to claim 1, wherein it is determined according to a name extension or a prefix of the URL or content of a response obtained after the URL is opened whether the URL is a mobile application program download URL.

5. The method according to claim 1, further comprising:
   after storing the security information of the mobile application program, receiving a second URL security check request sent by a second mobile terminal, the second URL security check request comprising the URL; and
   returning the security information of the mobile application program to the second mobile terminal.

6. A method for checking security of a uniform resource locator (URL) for a mobile terminal, comprising:
   at a terminal having one or more processors and a memory storing programs executed by the one or more processors;
   sending a first URL security check request to a server, the first URL security check request comprising a URL, wherein if the server determines that there is no security information corresponding to the URL, in response to determining that there is no security information corresponding to the URL, the server determines whether the URL is a mobile application program download URL; and
   receiving security information that is returned by the server and corresponds to the URL, including:
      when the URL is a mobile application program download URL and the server stores security information corresponding to the URL, receiving the security information that corresponds to the URL;
      when the URL is a mobile application program download URL and the server does not store security information corresponding to the URL, receiving a prompt information about unknown security and requesting a subsequent operation from a user, wherein the security information of the mobile application program is not returned to the mobile terminal after the server downloads and acquires the security information of the mobile application program; and when the URL is not mobile application program download URL, receiving the security information that corresponds to the URL.

7. The method for checking security of a URL for a mobile terminal according to claim 6, before the sending a URL security check request to a server, further comprising steps:

receiving a scan instruction, and scanning a two-dimensional code according to the scan instruction to obtain the URL.

8. The method for checking security of a URL for a mobile terminal according to claim 6, wherein the security information comprises any piece or any combination of the following information: a security level of the mobile application program, a name of a virus comprised in the mobile application program, and details about the virus.

9. A system for checking security of a uniform resource locator (URL) for a mobile terminal, comprising a server, and the server comprising:

one or more processors; and a memory storing a plurality of program modules comprising computer-implemented instructions executed by the one or more processors, the plurality program modules comprising:

a server information transceiver module, configured to receive a URL security check request sent by a mobile terminal, the URL security check request comprising a URL;

a query module, configured to determine, through querying, whether there is stored security information corresponding to the URL;

a URL type detection module, configured to detect whether the URL is a mobile application program download URL in response to determining that there is no security information corresponding to the URL;

a download module, configured to: when the query module finds no security information corresponding to the URL and the URL type detection module detects that the URL is a mobile application program download URL, download a mobile application program corresponding to the mobile application program download URL; and a security check module, configured to check security of the mobile application program, and directly store the security information obtained through checking the URL without returning the security information of the mobile application program to the first mobile terminal, wherein the server information transceiver module is further configured to:

when the query module finds that there is security information corresponding to the URL, send the security information corresponding to the URL to the mobile terminal;

when the query module finds that there is no security information corresponding to the URL, trigger the URL type detection module to detect whether the URL is a mobile application program download URL;

if the URL is not a mobile application program download URL, trigger the security check module to check the security of the URL, and return the security information of the URL to the mobile terminal; and if the URL is a mobile application program download URL, return prompt information about unknown security to the mobile terminal and request a subsequent operation from a user.

10. The system for checking security of a URL for a mobile terminal according to claim 9, wherein the URL is a URL obtained by scanning a two-dimensional code.

11. The system for checking security of a URL for a mobile terminal according to claim 9, wherein the security information comprises any piece or any combination of the following information: a security level of the mobile application program, a name of a virus comprised in the mobile application program, and details about the virus.

12. The system for checking security of a URL for a mobile terminal according to claim 9, wherein it is determined according to a name extension or a prefix of the URL or content of a response obtained after the URL is opened whether the URL is a mobile application program download URL.

\* \* \* \* \*